C. R. YIRAVA & W. J. HEJNA.
TROLLEY POLE HEAD.
APPLICATION FILED JUNE 30, 1917.
1,269,037.
Patented June 11, 1918.
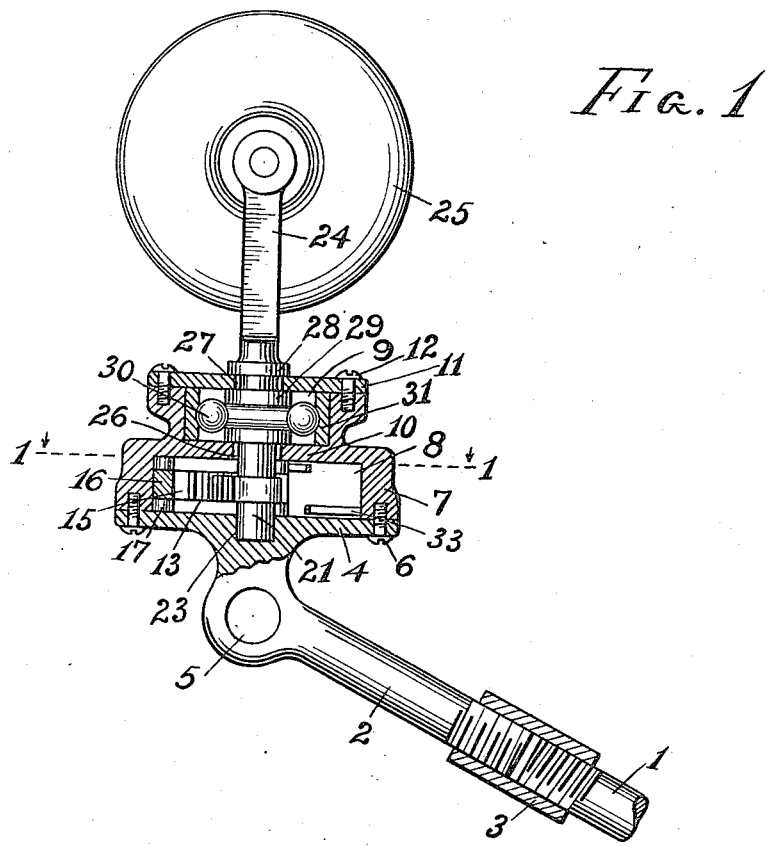
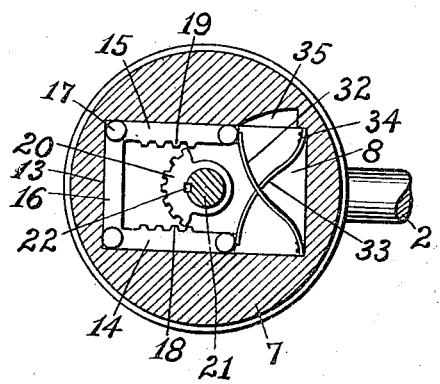
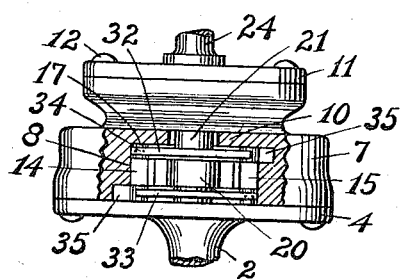
Inventors
C. R. Yirava and
W. J. Hejna.
By their Attorney

UNITED STATES PATENT OFFICE.

CHARLES R. YIRAVA AND WILLIAM J. HEJNA, OF CLEVELAND, OHIO.

TROLLEY-POLE HEAD.

1,269,037.  Specification of Letters Patent.  Patented June 11, 1918.

Application filed June 30, 1917. Serial No. 177,945.

*To all whom it may concern:*

Be it known that we, CHARLES R. YIRAVA and WILLIAM J. HEJNA, both citizens of the United States, residing at Cleveland, in the county of Cuyahoga and State of Ohio, have invented certain new and useful Improvements in Trolley-Pole Heads, of which the following is a specification.

This invention relates to trolley pole heads and has for its main object to provide a head for carrying a trolley wheel in such a manner as to maintain it in engagement with the trolley wire under varying conditions of strain and especially when rounding curves.

Another object of the invention is to provide a trolley pole head, which allows the trolley wheel to swing in order to accommodate itself to the trolley wire, and will automatically swing the trolley wheel to a central position after rounding curves or when detached from the trolley wire.

With the above and other objects in view as will be easily understood, the invention will be hereinafter fully described in connection with the accompanying drawings, which illustrate one way of carrying out the object sought, and the novel features thereof will be distinctly pointed out in the appended claims.

In the drawings like characters of reference denote corresponding parts.

Figure 1 is a sectional elevation of a trolley pole head constructed in accordance with our invention.

Fig. 2 is a sectional view taken on line 1—1 of Fig. 1, and

Fig. 3 is a front elevation of a part of the head, a portion being broken away to better show the construction.

Referring to the drawings, 1 represents the upper end of an ordinary trolley pole, to which is connected the shank 2 of the trolley pole head by means of a coupling 3. The shank forms a continuation of the trolley pole and supports a circular base 4, which is in a horizontal position while the shank is inclined to conform to the usual angle of the trolley pole. An eye 5 is provided in said shank for the attachment of the regular guide or pull rope. Resting upon and fastened to the base 4 by screws 6 is a housing 7, which is provided with a rectangular recess 8 at its lower side and a circular recess 9 at its upper side thereby leaving a wall 10 therebetween. A circular plate cover 11 is fastened to the top side of the housing 7 by screws 12 for closing the recess 9. The rectangular recess 8 is adapted to accommodate a rack 13 consisting of a pair of arms 14 and 15 formed integrally with a cross bar or back 16. Said rack is provided with feet 17 at its lower and upper corners, and these feet are adapted to keep the rack in a central position and slide upon the base 4 and wall 10. The inner sides of the arms 14 and 15 of the rack are provided with opposite sets of teeth 18 and 19 respectively, which teeth are adapted to be engaged by a toothed quadrant 20 keyed to a shaft 21, as indicated at 22. The lower end of this shaft is rotatably mounted in a bearing 23 provided in the base 4, and its upper end terminates in the usual harp 24 for supporting the trolley wheel 25. Said shaft passes loosely through openings 26 and 27 in the wall 10 and cover 11 respectively, and vertical movement thereof is prevented by means of the flange 28 of the shaft engaging the outer face of the cover and a ball bearing race 29, which is fixed to the shaft, engaging its under side. Free rotary movement of the shaft 21 is obtained by means of suitable ball bearings 30, which are interposed between the race 29 and a race 31 arranged in the circular recess 9 of the housing. A pair of suitable flat springs 32 and 33 having one of their ends fixed to the housing 7, as at 34, while their free ends press against the feet 17 of the rack 13, are adapted to force the rack to its normal position. When the free ends of said springs are forced back, they enter clearance spaces 35 in the side walls of the housing.

In operation, the trolley wheel will accommodate itself to the trolley wire under varying conditions of strain and especially when rounding curves, as it is free to swing in the housing 7. As the shaft 21 rotates to permit the trolley wheel to follow the wire, the teeth of the quadrant 20 will engage either one of the sets of teeth 18 or 19, depending upon whether the trolley wheel is swinging to the right or to the left, and thereby force the rack 9 toward the forward end of the rectangular recess 8 of the housing. Just the instant the strain of the wire upon the trolley wheel is relieved due to any cause whatever and especially when the trolley wheel strikes a straight stretch of wire or becomes detached therefrom, the springs 32 and 33 will force the rack 9 to its original position. This will rotate the shaft 21 and bring the trolley wheel back to its normal position.

Having fully described our invention, what we claim is:

1. In a trolley pole head, the combination with a trolley pole of a base, a shaft rotatably supported by the base, the shaft terminating in a harp, a trolley wheel pivotally mounted in the harp; a rack slidably carried by the base, a toothed quadrant fixed to the shaft adapted to engage the rack to move it in one direction, and means for forcing the rack in the opposite direction to rotate the shaft to its original position, substantially as described.

2. In a trolley pole head, the combination with a trolley pole of a base, a shaft rotatably supported by the base, the shaft terminating in a harp, a trolley wheel pivotally mounted in the harp, a rack slidably carried by the base, the rack having a pair of arms, the arms being provided with sets of teeth, a toothed quadrant fixed to the shaft adapted to engage either set of teeth to move the rack in one direction, and means for forcing the rack in the opposite direction to rotate the shaft to its original position, substantially as described.

3. In a trolley pole head, the combination with a trolley pole of a base, a housing carried by the base, the housing having a circular recess, a cover fixed to the housing over the circular recess, the cover being provided with an opening, a shaft passing through the opening, the shaft terminating in a harp, a trolley wheel pivotally mounted in the harp, the shaft having a flange engaging the outer face of the cover, a ball bearing race fixed to the shaft and engaging the other face of the cover, an outer race in said circular recess of the housing, ball bearings between said races, the housing having a rectangular recess, a rack slidably mounted in the rectangular recess, the rack having a pair of arms, the arms being provided with opposite sets of teeth, a toothed quadrant fixed to said shaft adapted to engage either set of teeth to move the rack in one direction, and springs for forcing the rack in the opposite direction to rotate the shaft to its original position, substantially as described.

In testimony whereof we affix our signatures.

CHARLES R. YIRAVA.
WILLIAM J. HEJNA.

Copies of this patent may be obtained for five cents each, by addressing the "Commissioner of Patents, Washington, D. C."